(12) United States Patent
Yim et al.

(10) Patent No.: US 6,605,914 B2
(45) Date of Patent: Aug. 12, 2003

(54) ROBOTIC TOY MODULAR SYSTEM

(75) Inventors: Mark H. Yim, Palo Alto, CA (US); David G. Duff, Woodside, CA (US); Samuel B. Homans, Oakland, CA (US); Kimon D. Roufas, Mountain View, CA (US); John W. Suh, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 45 days.

(21) Appl. No.: 09/939,368

(22) Filed: Aug. 24, 2001

(65) Prior Publication Data

US 2003/0038607 A1 Feb. 27, 2003

(51) Int. Cl.$^7$ .................................................. B25J 9/18
(52) U.S. Cl. .............................. 318/568.11; 318/568.12; 318/568.2; 318/568.24; 318/568.21; 901/23
(58) Field of Search ........................ 318/568.11, 568.12, 318/568.2, 568.21, 568.24, 564; 901/23, 15, 8, 28, 6, 9; 446/91

(56) References Cited

U.S. PATENT DOCUMENTS

| | | | |
|---|---|---|---|
| 5,103,403 A | 4/1992 | Ch'Hayder et al. | 395/98 |
| 5,523,662 A | 6/1996 | Goldenberg et al. | 318/568.11 |
| 6,084,373 A | 7/2000 | Goldenberg et al. | 318/568.11 |
| 6,150,738 A * | 11/2000 | Yim | 307/125 |
| 6,454,624 B1 * | 9/2002 | Duff et al. | 446/91 |

FOREIGN PATENT DOCUMENTS

WO    WO 00/45925    8/2000

* cited by examiner

Primary Examiner—Karen Masih
(74) Attorney, Agent, or Firm—Linda M. Robb

(57) ABSTRACT

A robotic module for a toy construction system includes a housing enclosing a gear mechanism and an actuator connected to a pivot mechanism to supply operational power for rotation. An energy storage device supplies power to the actuator, which rotates in response to instructions received from a control unit connected to the actuator. A connection plate forms a connection between at least two of the modules. At least one position sensor is provided to sense the arrangement of the modules connected together.

19 Claims, 7 Drawing Sheets

ROBOTIC TOY MODULAR SYSTEM

CROSS REFERENCE TO RELATED APPLICATIONS

The following copending applications, U.S. application Ser. No. 09/938,924, filed Aug. 24, 2001, titled "Robotic Toy with Posable Joints", and U.S. application Ser. No. 09/939,186, filed Aug. 24, 2001, titled "Robotic Toy Modular System with Distributed Program", are assigned to the same assignee of the present application. The entire disclosures of these copending applications are totally incorporated herein by reference in their entirety.

This work was funded in part by the Defense Advanced Research Projects Agency (DARPA), Contract #MDA972-98-C-0009. The U.S. Government may have certain rights in this invention.

INCORPORATION BY REFERENCE

The following U.S. Pat. Nos. are fully incorporated herein by reference: U.S. Pat. No. 5,103,403 to Ch'Hayder et al. ("Redundant Modular Robot"); U.S. Pat. No. 5,523,662 to Goldenberg et al. ("Modular, Expandable and Reconfigurable Robot"); U.S. Pat. No. 6,084,373 to Goldenberg et al. ("Reconfigurable Modular Joint and Robots Produced Therefrom") and International Pat. No. WO 00/45925 to Munch et al. ("A Programmable Toy with Communication Means").

BACKGROUND OF THE INVENTION

This present invention relates generally to reconfigurable modular robotic systems, and more particularly this invention relates to robotic modules which may be reconfigured in multiples in a robotic toy construction system.

Modular robotic systems are those systems that are composed of modules which can be disconnected and reconnected in various arrangements to form a new system enabling new functionalities. This results in multiple possible robot structures for the same number of robotic modules. The user interconnects a certain number of modules to form a desired system based on the task to be accomplished by the system. Such systems tend to be more homogeneous than heterogeneous. That is, the system may have different types of modules, but the ratio of the number of module types to the total number of modules is low. In traditional robotic systems, one or more mechanisms, such as robotic arms, or manipulators, may be connected to a control system, which controls the motion and actions in accordance with a task specification and program. The motions may include point-to-point motion, or trajectory tracking motion. Actions may include end-effector control or interfacing to other systems such as tools and machines.

The controller for traditional systems is a centralized unit which is connected to the robotic system through a multi-conductor cable system. Therefore, a system assembled from such modules is modular only in a limited mechanical sense, and its reconfigurability is limited. Because the control system electronics are centralized, the modules cannot be considered as intelligent single units, since they lack dedicated control processors and associated software.

Robotic systems have also found applications within the toy industry. Toy development has proceeded from simple functions such as the playing of sounds in dolls, performance of simple patterns of movement in robots, to the development of robotic toys with sophisticated patterns of action and a form of behavior.

Toy building elements may perform different physical actions partially through programming the building element and partially by building a structure which consists of interconnected toy building elements of various types. Through a variety in types of building elements, there are numerous possibilities for forming structures and giving the structures various functions. The physical actions of the structures may comprise simple or relatively complex movements controlled by an electric motor or may include the emission of light or sounds. The toy's physical actions may be conditioned by the interaction of the toy with its surroundings, and the toy may be programmed to respond to physical contact with an object or to light, or possibly sound, and to change its behavior on the basis of the interaction. Such programmable toys are programmed by a central processing unit to make unconditioned as well as conditioned responses.

However, these toys require an external central processing unit programming the elements and directing its movement and also a variety of types of building elements. The object of this invention is to provide a modular robotic toy construction system having active modules, each with its own micro-controller, actuators, input and output devices capable of being easily connected to each other by integrated mechanical and/or electrical connections into configurations which function as a single robotic unit.

The following patents illustrate existing modular robotic elements or toys:

U.S. Pat. No. 5,103,403 to Ch'Hayder et al., titled "Redundant Modular Robot", discloses a robotic structure having a succession of stages, with each stage including a platform and actuators, to permit displacement of a terminal from an initial position to a final position. The succession of stages is controlled by a central processor, which determines a configuration of the robotic structure corresponding to the final position to be attained by the terminal and remotely operating the actuators to arrange the various stages according to the desired configuration.

U.S. Pat. No. 5,523,662 to Goldenberg et al., titled "Modular, Expandable and Reconfigurable Robot", teaches a robotic system having manipulators and compact rotary joints with input and output couplings. Each manipulator may be disassembled and reassembled to assume a multitude of configurations. The system is controlled by a computer architecture utilizing processor nodes and a point-to-point communication network. Each node includes a host computer and parallel input/output modules, with each node capable of controlling eight joints.

U.S. Pat. No. 6,084,373 to Goldenberg et al., titled "Reconfigurable Modular Joint and Robots Produced Therefrom", discloses reconfigurable modular drive joint which can be set up in either a roll, pitch, or yaw configuration. An embedded control system includes a power amplifier for the motor, a sensor interface, microprocessor, and communication circuitry. The only external connections to each module are a communication bus between the modules and the host computer and a power supply bus.

International Patent No. WO 00/45925 to Munch et al., titled "A Programmable Toy with Communication Means", which teaches a microprocessor controlled toy building element which may be coupled to other building elements. For example, it may be coupled to a separate structure having a motor and wheels to form a motorized toy vehicle. Each microprocessor executes instructions stored in a memory, which contains subprograms which may be activated individually by specifying a list of subprogram calls. The toy has a transmitter for communicating instructions to a second toy.

SUMMARY OF THE INVENTION

Briefly stated, and in accordance with one aspect of the present invention, there is provided a robotic module for a toy construction system. The robotic module includes a housing enclosing a gear mechanism and an actuator connected to a pivot mechanism to supply operational power for rotation. An energy storage device supplies power to the actuator, which rotates in response to instructions received from a control unit connected to the actuator. A connection plate forms a connection between at least two of the modules. At least one position sensor is provided to sense the arrangement of the modules connected together.

In accordance with another aspect of the present invention, there is provided an assemblage of robotic modules for a toy construction system. The assemblage of robotic modules consists of a plurality of robotic modules connected together. Each robotic module includes a housing enclosing a gear mechanism and an actuator connected to a pivot mechanism to supply operational power for rotation. An energy storage device supplies power to the actuator, which rotates in response to instructions received from a control unit connected to the actuator. A connection plate forms a connection between at least two of the modules. At least one position sensor is provided to sense the arrangement of the modules connected together.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

Toy construction systems which contain robotic elements are designed to be used to assemble a single robot controlled by a central processing unit (CPU) which controls one or several motors, sensors, or other electronic components. While it may be possible to link more than one CPU together, this would require considerable sophistication and effort and could be accomplished only by advanced users. This invention is a toy construction system that consists of active modules, each of which integrates a microcontroller with components such as actuators, input devices, and output devices. A system would typically contain multiple copies of each module, repeated as many times as is necessary to achieve a desired structure. These modules are easily connected to each other by their integrated mechanical and/or electrical connections and are automatically networked together. The system functions as a single connected robot whose behavior may be programmed by various means, rather than a group of separate modules.

Figure 1:
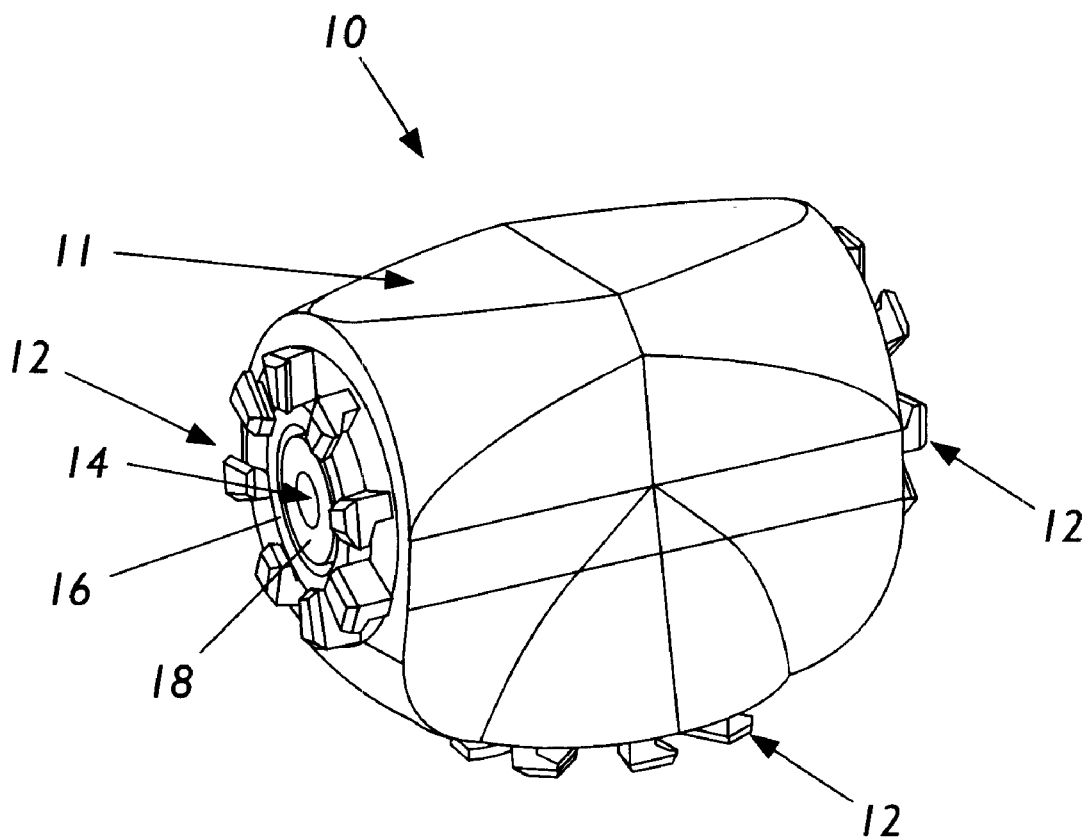
FIG. 1 is a perspective view of one embodiment of the modular element of the present invention.

Referring to FIG. 1, there is illustrated one embodiment of the robotic module 10 of the present invention. A housing 11, which may be comprised of any of numerous known plastic materials, supports three or more connection plates, one of which is connected to the output shaft of an actuator, for example a motor. At least one connection plate may connect it mechanically and electrically to other modules. Other connection plates may function solely as mechanical connection points to other robotic modules 10. The connection plate center 14 permits communications among the modules, for example by IR or through other means of communication such as electrical signals transmitted by making electrical contact, by induced electrical signals, or by audio or vibrational signals. Ring contacts 16 and 18 provide electrical connections between modules. The materials used in the housing and other parts may be made from injected molded plastic or other materials such as sheet-cut or molded plastic, metal, paperboard, wood or ceramics. It will be understood that FIG. 1 illustrates only one of many possible configurations for housing 11. For example, housing 11 may be more rounded, or cubic, or polyhedral in shape.

For the purposes herein, the module is described as having a housing and connection plates enclosing and supporting an internal structure. However, it will be appreciated that the module may take any of numerous shapes and configurations, such as those described in related co-filed application U.S. Ser. No. 09/939186, titled "Robotic Toy Modular System with Distributed Program", to Yim et al. and hereby fully incorporated by reference.

Figure 2:
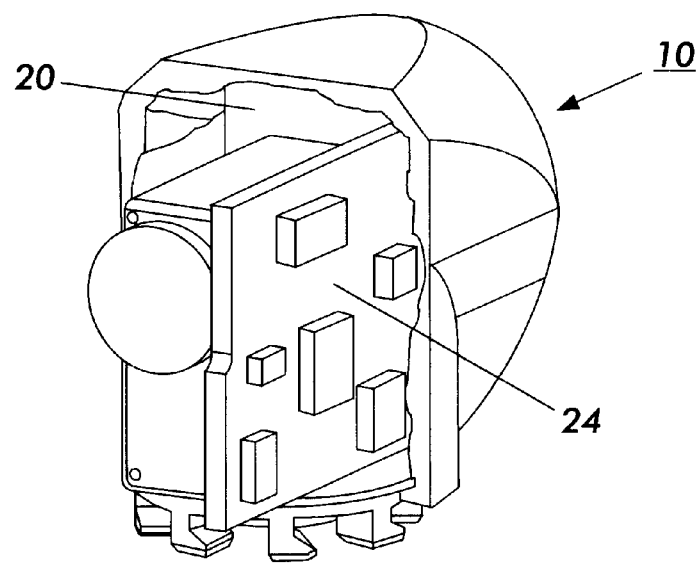
FIG. 2 is a cross sectional view of the modular element of FIG. 1.

FIG. 2 shows a cross sectional view through the housing of robotic module 10, containing a gear set and controls including servo motor 22, which may be of any known type, such as an electric DC motor, other rotational motors such as AC, a brushless motor, a motor with backdriveable gearing, or a motor with non-backdrivable gearing and a torque limiting clutch between the actuator and the structure. The actuator gearing may be plastic, metal, or a combination of the two and may consist of one or more types of gear stages such as worm and wormgear, spur gear, planetary, or harmonic gears. Low speed, high torque actuators such as ultrasonic motors or piezoelectric motors may also be well suited to this application. The servo actuator rotates through approximately 190 degrees of motion, though it is understood that any rotation is possible, even continuous unending rotation, and that a gear set may or may not be needed in the transmission.

Each module also includes a CPU 25, which may be preprogrammed or can be programmed externally, mounted on printed circuit board 24 within the unit. The CPU may include non-volatile memory, battery backed RAM, input/output ports, analog to digital converters, timers, analog comparators, or other like devices. Energy storage device 20 includes two to three NiMh 1.5 v batteries or other known energy storage device, such as rechargeable or non-rechargeable but replaceable batteries, or super caps. Because sensors and actuators are integrated with the CPU into a single unit which is firmly connected to its adjoining unit, the system does not fall apart if dropped or moved.

Through position sensors and the CPU, the robot can sense its configuration, or module arrangement, since the individual module CPUs are automatically networked together through the connection plate between modules. Communication ports can be used as a neighbor-detecting sensor to sense the existence of a module attached to a particular port on a module. A proximity sensor on the port may be used, or a local communication means that attempts to communicate to the neighboring port can be used to detect the existence of a neighboring adjacent module. Because the individual module CPUs are automatically networked together through the connection plate between modules, a global image of the relative connections of the modules may be determined. The module may also contain any of numerous possible other sensors such as touch sensors, bump sensors, light sensors, audio sensors, ranging sensors, proximity sensors, temperature sensors, or gas sensors.

The robotic module can automatically select from a number of preprogrammed routines for the specific configuration of its modules that the system senses. For example, a system that has modules attached end to end may detect where modules are attached to each other and thus infer that the shape is snake-like and then control the system to use a preprogrammed snake-like motion. It is understood that any configuration may thus be used to indicate any desired motion that may be pre-stored or generated automatically. Alternatively, the robot may be programmed from a personal computer, a PDA, or a digital telephone. Depending on the sophistication of the user, the robot may be tele-operated, function semi-autonomously, or completely autonomously.

Figure 3:
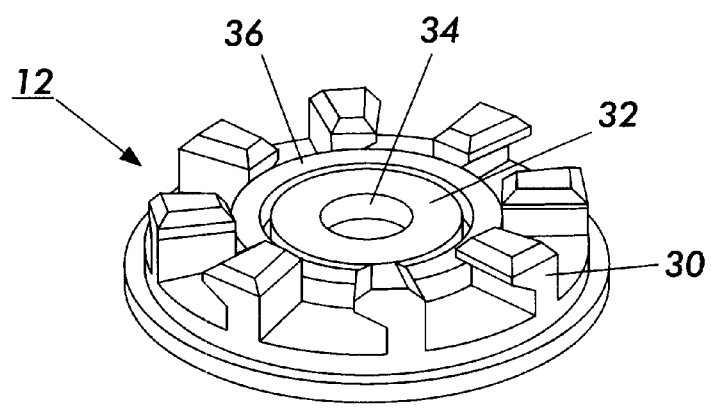
FIG. 3 is a perspective view of one embodiment of a connection plate for the modular element of FIG. 1.

The connection plate 12 is shown in more detail in FIG. 3. Each connector plate includes connector teeth 30 allowing for positioning of the module relative to its adjacent module. As may be appreciated, any number of connector teeth may be used which changes the number of ways that two connectors can be mated together. For example, eight teeth allow eight rotational positions of the module relative to its adjacent module; six teeth would allow six positions. Although not necessary, symmetrical positioning of the teeth permits more flexibility in connection of the faces of the modules through rotation. Non-symmetric tooth positioning, also contemplated herein, provides for restriction on the positioning, or keying, of the modules at the connection point. This may advantageously reduce the number of communications or sensing devices to automatically determine the relative orientation of two connection plates. Each live connection plate may also include two concentric ring electrical contacts separated by a gap. Outer ring 36 is for power and inner ring 32 is for ground. Alternatively, the electrical contacts may be pins which meet end to end, pins that mate, or the electrical contacts may be in the form of a hermaphroditic connector. The center of the connection plate contains opening 34 to permit the exchange of IR or other types of signals among modules, such as inter-module communication or sensing of a neighbor module. The live connection plate connects to and is driven by the servo motor.

Figure 4:
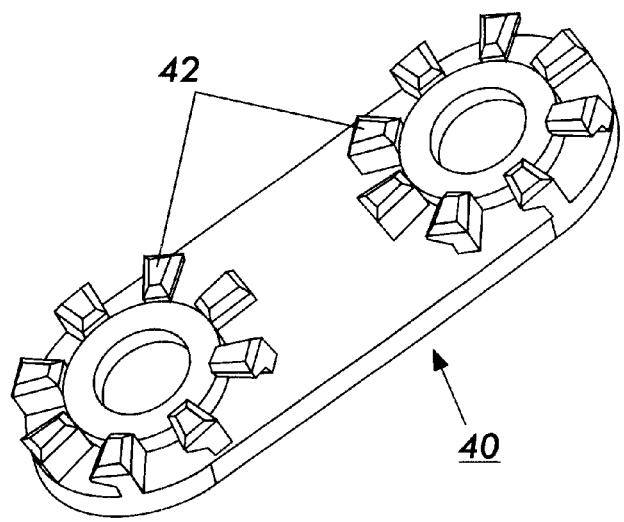
FIG. 4 is a perspective view of one embodiment of a connector arm for the modular element of FIG. 1.

The connector arm 40 illustrated in FIG. 4 connects to both the fixed and live connection plates of the robotic module to connect modules electrically and mechanically together. Alternatively, the robotic modules may be connected directly to one another or in any combination of connection plates and direct connections. This embodiment of connector arm 40 permits 180 degree attachments. Teeth 42 have a profile suitable for locking the attaching module in position and may take the form of any of numerous possible profiles which are capable of coupling mechanically.

Figure 5:
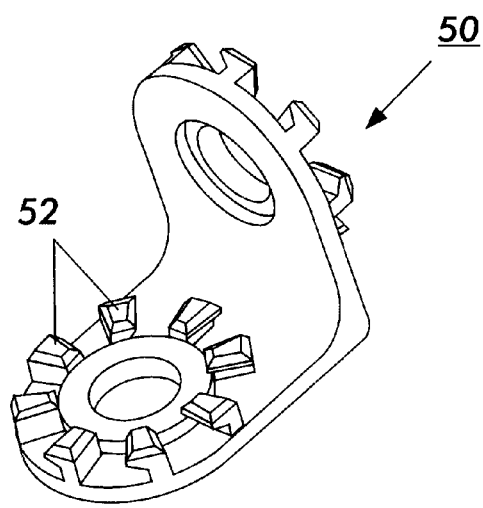
FIG. 5 is a perspective view of another embodiment of a connector arm for the modular element of FIG. 1.

Referring now to FIG. 5, there is shown connector arm 50, which permits 90 degree attachments. Teeth 52 have the same purpose and serve the same function as Teeth 42 in FIG. 4. It will be understood that FIGS. 4 and 5 illustrate only two of many possible connector arm configurations having at least two connection ports, all of which are contemplated by the disclosure herein.

Figure 6:
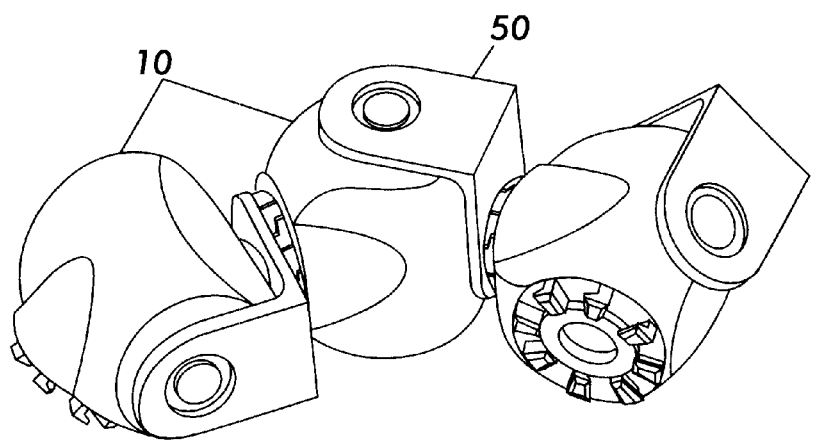
FIG. 6 is a perspective view of several modular elements connected with the connector arm of FIG. 5.
Figure 7:
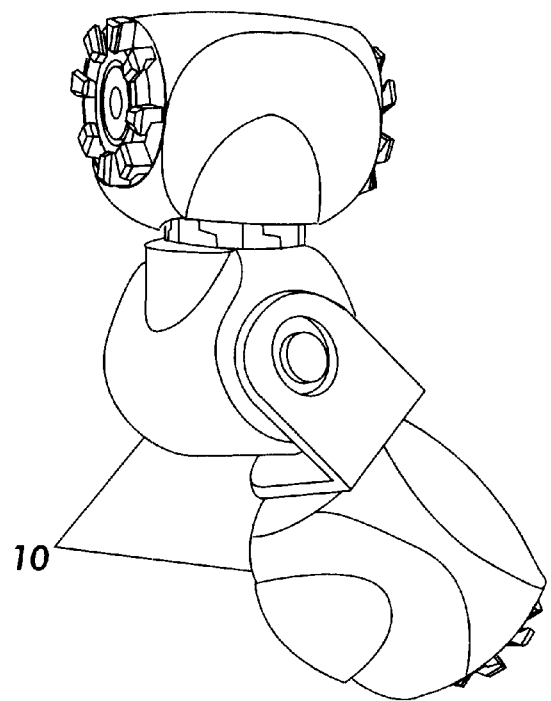
FIG. 7 is a perspective view of several modular elements connected with the connector arm of FIG. 4.

Examples of possible connections between robotic modules 10 and connector arm 50 are illustrated in FIGS. 6 and 7.

Figure 8:
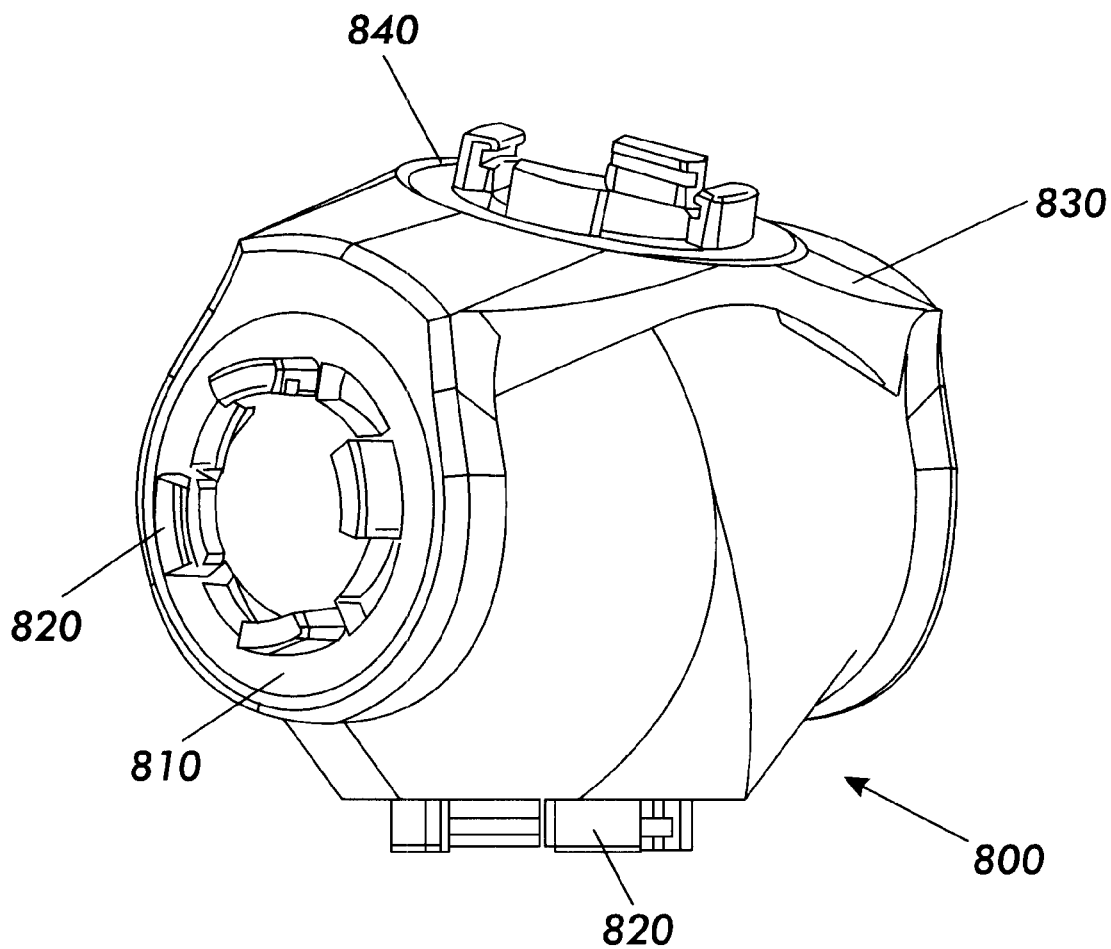
FIG. 8 is a perspective view of another embodiment of the modular element of the present invention.

Referring now to FIG. 8, there is shown an alternate embodiment of the robotic module 800 disclosed herein. In this embodiment, connectors 810 each have four teeth 820. Additionally, U-shaped connector 830 is positioned on top of robotic module 800 and is attached to two opposing connectors 810. Connector arm 830 thus adds an additional mechanical connection port 840, giving robotic module 800 four connection ports. Rotations of the actuator of module 800 may move this connector arm with greater than 180 degrees of range.

Figure 9:
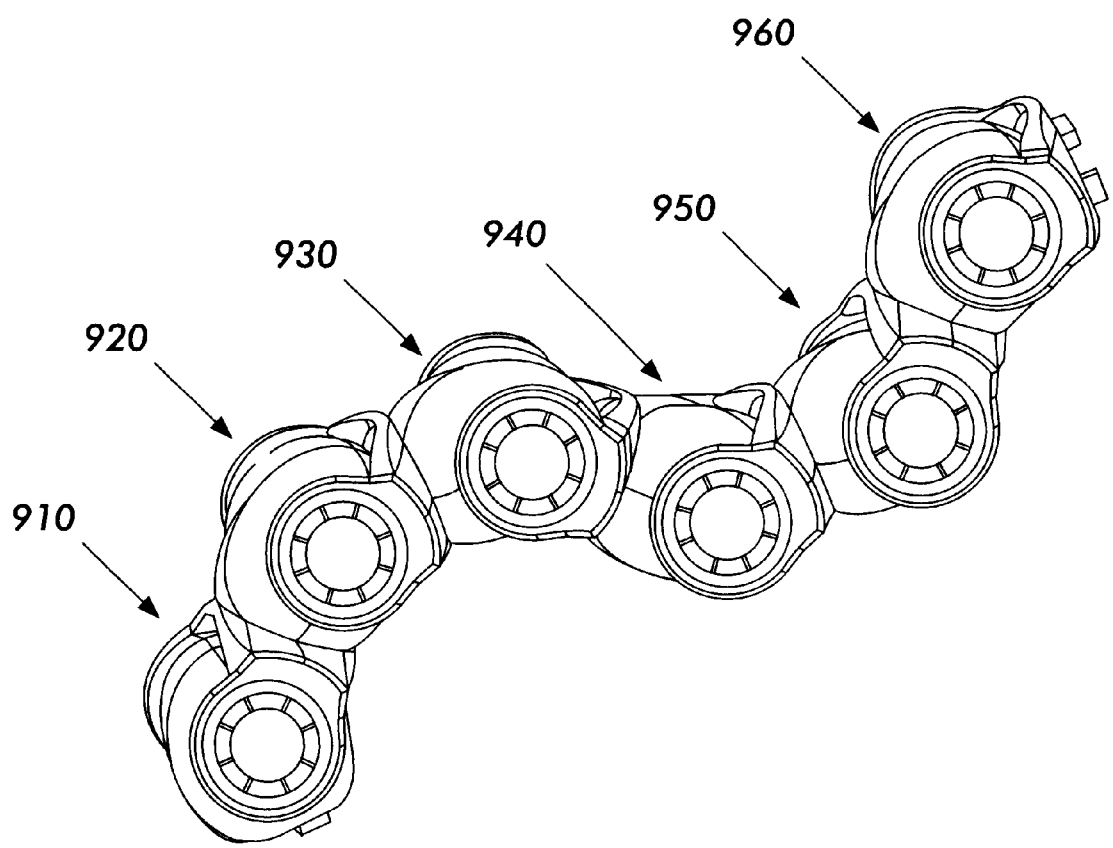
FIG. 9 illustrates one possible configuration for a plurality of the modular elements of FIG. 1.

Referring now to FIG. 9, there is shown an embodiment of one of the many shapes it is possible to achieve by connecting the modules of FIG. 1. In this embodiment, modules 910, 920, 930, 940, 950 and 960 are connected end-to-end to form a linear shape which may flex and move in a snake-like motion.

Figure 10:
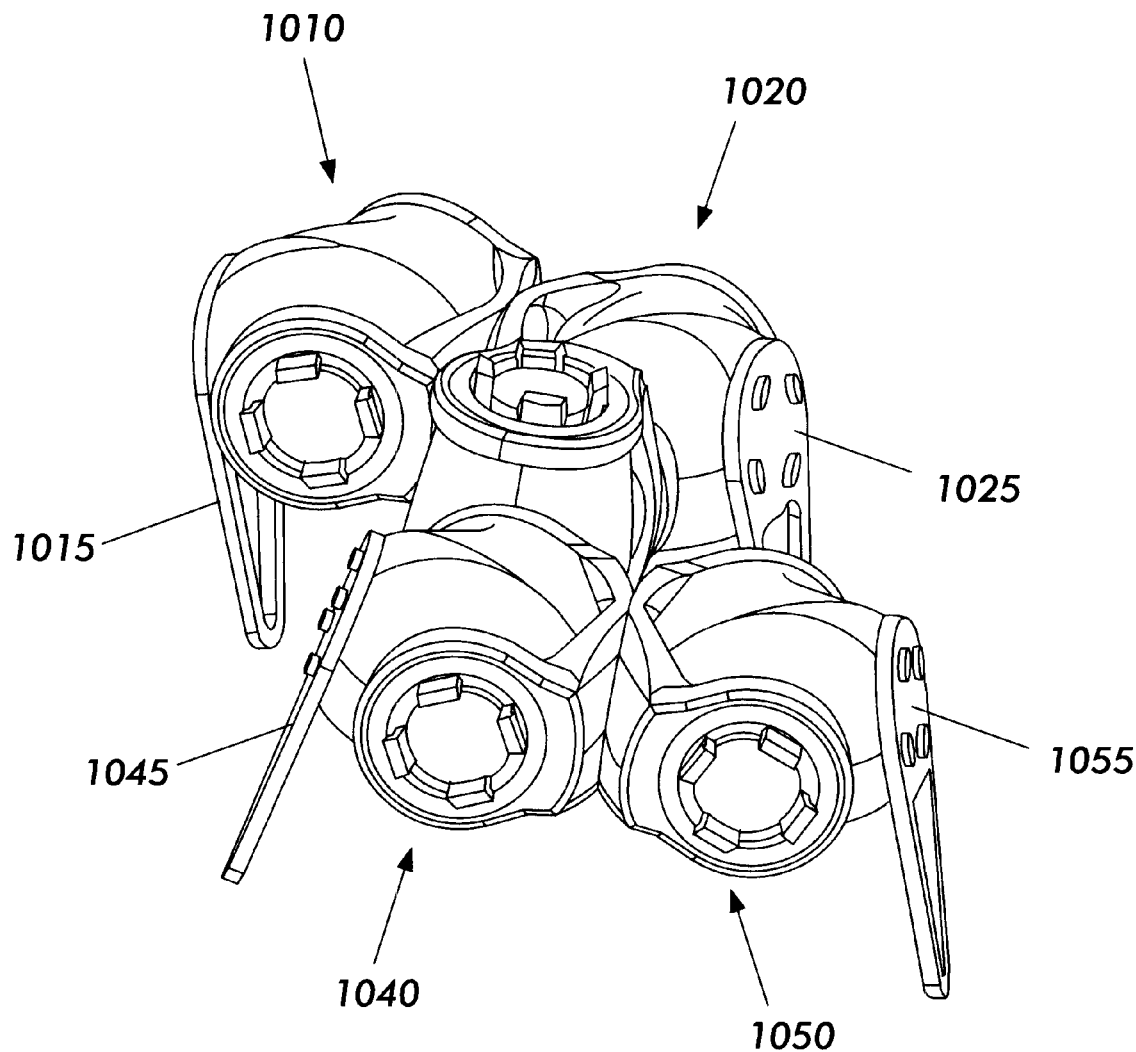
FIG. 10 illustrates another possible configuration for a plurality of the modular elements of FIG. 1.

FIG. 10 illustrates another possible configuration, in which five modules 1010, 1020, 1030, 1040 and 1050 are connected such that central module 1030 connects two pairs of modules. The first pair of modules, 1010 and 1020, extends from one connector plate of module 1030, while the second pair of modules, 1040 and 1050, extend from a second connector plate of module 1030. In this embodiment, modules 1010 and 1020 may move rotationally about an axis extending through the center of the actuator of module 1030. Module 1040 similarly may move rotationally about an axis extending through the center of the actuator module 1030. Modules 1010, may move rotationally about an axis extending through the center of the connector plate between module 1020 and module 1010; module 1050 may move rotationally about an axis extending through the center of the connector plate between module 1040 and module 1050. The effect of these combined movements it to provide the capability of moving legs up and down to create a walking gait. Passive components 1015, 1025, 1045 and 1055 are attached to the ends of modules 1010, 1020, 1040 and 1050 respectively. In this embodiment the passive components allow the modules to which they are attached to function as feet. It will be appreciated that other types of passive components permitting other functionalities could also be attached to the modules in varying combinations.

As will be appreciated by one skilled in the art, there are many possible arrangements of such modules. The modular robotic system is also extensible, enabling the user to add more modules to construct larger and more complex structures.

While the present invention has been illustrated and described with reference to specific embodiments, further modification and improvements will occur to those skilled in the art. A "CPU", as used herein, can mean any device which stores, processes, routes, manipulates, or performs like operation on data. It is to be understood, therefore, that this invention is not limited to the particular forms illustrated and that it is intended in the appended claims to embrace all alternatives, modifications, and variations which do not depart from the spirit and scope of this invention.

What is claimed is:

1. A robotic module for a toy construction system comprising:
    a housing having not less than three connection surfaces integrally attached to said housing;
    an actuator connected to a pivot mechanism to supply operational power for rotation;
    at least one connection plate for forming a connection between at least two of the robotic modules, wherein said connection plate includes a plurality of connector teeth having a profile suitable for locking an attaching robotic module into position;
    a gear mechanism connected to said actuator for transmitting rotational motion from said actuator;
    a control unit connected to said actuator to control rotation of the robotic module;
    an energy storage device adjacent to said actuator, for providing electrical energy utilized for operation of the robotic module; and
    at least one position sensor for sensing module arrangement.

2. The robotic module according to claim 1, wherein said actuator comprises a servo motor.

3. The robotic module according to claim 1, wherein said control unit comprises a central processing unit.

4. The robotic module according to claim 3, wherein said central processing unit is pre-programmed.

5. The robotic module according to claim 3, wherein said central processing unit is programmed externally.

6. The robotic module according to claim 1, wherein said energy storage device comprises at least one battery.

7. The robotic module according to claim 1, wherein at least one said connection plate forms a mechanical and electrical connection between two robotic modules.

8. The robotic module according to claim 1, wherein at least one said connection plate forms a mechanical connection between two robotic modules.

9. The robotic module according to claim 1, wherein said connection plate further comprises a connection plate center.

10. The robotic module according to claim 9, wherein said connection plate center contains an opening for permitting the exchange of signals among connected robotic modules.

11. The robotic module according to claim 9, further comprising electrical contacts for providing electrical connections between connected modules.

12. The robotic module according to claim 11, wherein said electrical contacts comprise concentric ring electrical contacts.

13. The robotic module according to claim 11, wherein said electrical contacts comprise pins.

14. The robotic module according to claim 11, wherein said electrical contacts comprise mating electrical contacts.

15. The robotic module according to claim 9, wherein said plurality of connector teeth comprises eight teeth.

16. The robotic module according to claim 1, further comprising a plurality of sensing devices.

17. An assemblage of robotic modules for a toy construction system, the assemblage comprising a plurality of robotic modules connected together, each robotic module having a housing, an actuator connected to a pivot mechanism to supply operational power for rotation, at least one connection plate forming a connection between at least two of the robotic modules by means of connection teeth having a profile suitable for locking an attaching robotic module into position, a gear mechanism connected to said actuator for transmitting rotational motion from said actuator, a control unit connected to said actuator to control rotation of the robotic module, an energy storage device adjacent to said actuator, for providing electrical energy utilized for operation of the robotic module, and position sensors communicating with said control unit for sensing module arrangement.

18. The assemblage of robotic modules according to claim 17, wherein a connector arm connects to the connection plates of at least two said robotic modules, for connecting the modules together.

19. The assemblage of robotic modules according to claim 17, further comprising passive components attached to said robotic modules.

* * * * *